United States Patent [19]

Vaccaro et al.

[11] Patent Number: 5,106,050

[45] Date of Patent: Apr. 21, 1992

[54] MOUNTING SYSTEM

[75] Inventors: Robert K. Vaccaro, Philadelphia; Arie Cohen, Huntingdon Valley; Kevin J. Grant, Lansdale, all of Pa.

[73] Assignee: Air-Shields, Inc., Hatboro, Pa.

[21] Appl. No.: 656,421

[22] Filed: Feb. 15, 1991

[51] Int. Cl.$^5$ ............................................. F16M 3/00
[52] U.S. Cl. ................................. 248/674; 324/468; 174/101; 248/74.2; 248/316.7; 403/362; 403/364
[58] Field of Search ............... 248/674, 205.1, 231.8, 248/313, 316.1, 316.7, 74.1, 74.2, 74.4; 24/468; 403/364, 362; 174/68.3, 101

[56] References Cited

U.S. PATENT DOCUMENTS

| | | | |
|---|---|---|---|
| 2,863,682 | 12/1958 | Canepa | 403/362 X |
| 3,433,270 | 3/1969 | Fischer et al. | 174/101 X |
| 3,761,603 | 9/1973 | Hays et al. | 174/101 |
| 4,961,554 | 10/1990 | Smowton | 248/74.1 X |

FOREIGN PATENT DOCUMENTS 1505517 12/1967 France .............................. 174/101

Primary Examiner—Ramon O. Ramirez
Attorney, Agent, or Firm—Ratner & Prestia

[57] ABSTRACT

A system for mounting various pieces of equipment at selected locations along the length of a support member. A clamping unit, releasably mounted on the support member for adjustable positioning of the clamping unit, is fixed in place by the action of locking means which draw a protrusion on a clamping piece into intimate contact with opposed contact surfaces in a groove running along the length of the support member. The opposed contact surfaces of the groove form an acute angle transverse to the length of the support member. With the support member formed as an open channel, cables from the equipment being mounted can be positioned within the channel and clips snap-fitted into the opening in the channel close off the opening in the channel at selected locations and form smaller openings through which the cables pass.

14 Claims, 3 Drawing Sheets

MOUNTING SYSTEM

TECHNICAL FIELD

The present invention relates, in general, to the mounting of equipment and, in particular, to a system useful in positioning various pieces of equipment in proximity to each other.

BACKGROUND OF THE INVENTION

Often, when it is necessary to arrange various pieces of equipment in proximity to each other, there is limited space or surface area or convenience for locating the equipment, so that it may be used efficiently. This problem arises in many different situations. For example, in a hospital nursery where a premature infant is treated in an incubator, other pieces of equipment (i.e. monitors, auxiliary humidifiers) often must be used in conjunction with the incubator to provide the proper care for the infant.

Many forms of equipment mounting systems are available or have been suggested previously. The general requirements of such systems are: (1) flexibility to accommodate the bringing together of different types of equipment for arrangement in ways most convenient to the user, (2) capacity to support equipment of widely varying weights and sizes, (3) facility to quickly position and reposition the equipment being mounted, (4) simplicity of operation, and (5) reasonable cost. The particular application of a mounting system is likely to dictate the relative importance of any of these factors.

DISCLOSURE OF THE INVENTION

A mounting system, constructed in accordance with the present invention, includes a support member and a clamping unit releasably mounted on the support member for adjustable positioning of the clamping unit at a selected location along the length of the support member. The support member has a groove extending along the of the support member in a first surface of the support member and the groove has a pair of opposed contact surfaces forming an acute angle transverse to the length of the support member. The clamping unit has a clamping piece which has a protrusion at a first end which fits into the groove in the support member and bears against the opposed contact surfaces of the groove. The clamping unit also has locking means at a second end which engage a second surface of the support member opposite from the first surface for drawing the protrusion at the first end of the clamping piece into intimate contact with the opposed contact surfaces of the groove in the support member.

Another aspect of the present invention is the arrangement of the support member so that cables can be contained within the support member and pass into the support member at selected points along the length of the support member. As such, a cable-containing mounting system, constructed in accordance with the present invention, includes a support channel having an opening extending along the length of the support channel through which a length of cable can be passed to extend within the support channel along the length of the support channel. One or more clips, snap-fitted into the opening in the support channel, close off the opening in the support channel and define edges of smaller openings spaced along the length of the support channel through which cables extending within the support channel pass.

BEST MODE OF CARRYING OUT THE INVENTION

Referring to FIGS. 1 through 4, a mounting system, constructed in accordance with the present invention, includes a support member 10 having a groove 12 which extends along the length of the support member in a first surface 14 of the support member. Surface 14 is the outside surface of a first leg 16 of support member 10.

Figure 1:
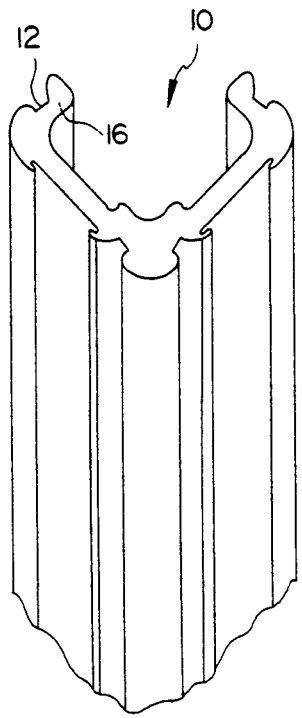
FIG. 1 is a perspective view of a preferred embodiment of the support member of a mounting system constructed in accordance with the present invention.
Figure 3:
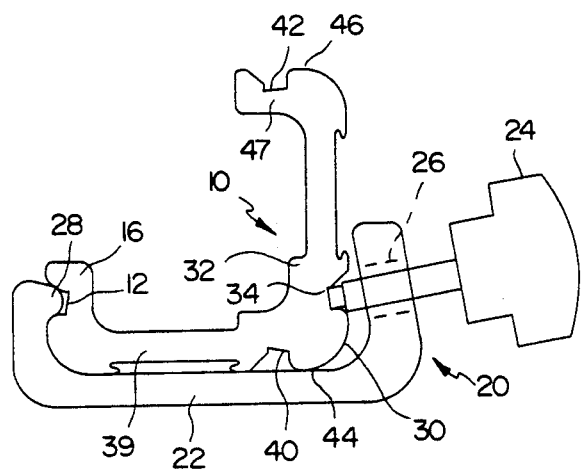
FIG. 3 is a top view of a preferred embodiment of a mounting system constructed in accordance with the present invention.
Figure 2:
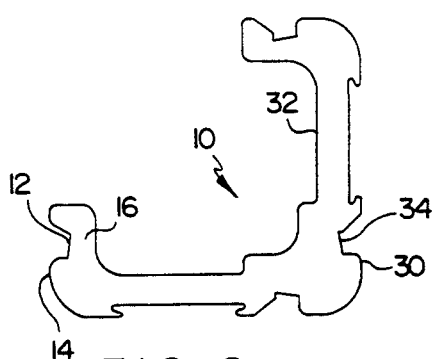
FIG. 2 is a top view of the FIG. 1 support member.
Figure 4:
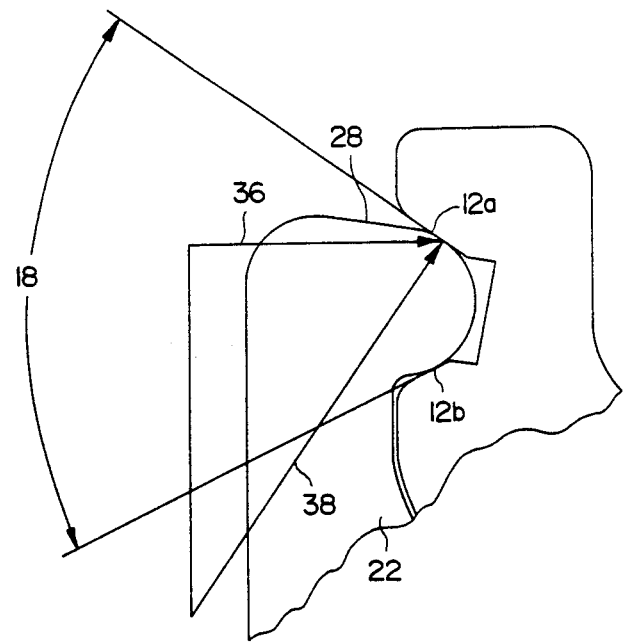
FIG. 4 is a force diagram in an enlarged view of a portion of the FIG. 3 mounting system.

Groove 12 has a pair of opposed contact surfaces 12a and 12b, shown most clearly in FIG. 4, which form an acute angle 18 transverse to the length of support member 10. For the embodiment of the invention illustrated in the drawings, acute angle 18 of groove 12 is approximately sixty degrees and the bottom surface of the groove is disposed at an angle of approximately ten degrees to leg 16.

A mounting system, constructed in accordance with the present invention, also includes a clamping unit 20 which is releasably mounted on support member 10 for adjustable positioning of the clamping unit at a selected location along the length of the support member. Clamping unit 20 is composed of a clamping piece 22 and locking means, in the form of a threaded knob 24 extending through a threaded bore 26 in the clamping piece, for fastening the clamping unit in place at the selected location along the length of support member 10

Clamping piece 22 has a protrusion 28 at a first end which is fitted within groove 12 in support member 10. The relative sizes and shapes of groove 12 in support member 10 and protrusion 28 of clamping piece 22 are such that the protrusion bears against opposed contact surfaces 12a and 12b of the groove.

The locking means of clamping unit 20, namely threaded knob 24 extending through threaded bore 26, are at a second end of clamping piece 22. The point end of threaded knob 24 engages a second surface 30 of support member 10 opposite from surface 14 of the support member. Surface 30 is the outside surface of a second leg 32 of support member 10 which extends parallel to leg 16 of the support member. For the embodiment of the invention illustrated in the drawings, a second groove 34, which extends along the length of support member 10 and is identical to groove 12, is provided in leg 32 and the point end of threaded knob extends into groove 34.

As threaded knob 24 is turned and the point end of the threaded knob bears against the bottom of groove 34, protrusion 28 at the other end of clamping piece 22 is drawn into intimate contact with opposed contact surfaces 12a and 12b of groove 12. Referring to FIG. 4, force vector 36 represents the direction and magnitude of the force applied in bringing protrusion 28 of clamping piece 22 against contact surfaces 12a and 12b as threaded knob 24 is turned. Force vector 38 represents the force normal to the contacting surfaces which determines the frictional force between the contacting surfaces. As can be seen from FIG. 4, by applying a force to contact surfaces 12a and 12b which are disposed at an acute angle, the frictional resistance to sliding of clamping unit 20 along support member 10 is increased as indicated by the size of force vector 38 compared to the size of force vector 36.

In order to draw clamping piece 22 into contact with support member 10, so that the tendency for rattle between the support member and the clamping piece is reduced, if not eliminated, threaded knob 24 is disposed at an angle of less than ninety degrees to leg 32 of the support member. As a result of applying the force of threaded knob 24 this way, clamping piece 22 pivots about the contact between protrusion 28 and groove 12 and is drawn against a third leg 39 of support member 10 which extends between legs 16 and 32 of the support member.

For the embodiment of the invention illustrated in the drawings, groove 34 in support member 10 is identical to groove 12 and a second pair of grooves 40 and 42, extending along the support member in surfaces 44 and 46, respectively, also are provided. Surface 44 is the outside surface of leg 39 and surface 46 is the outside surface of a fourth leg 47. Grooves 40 and 42, identical to each other and to grooves 12 and 34, are disposed relative to each other in a manner identical to the relative dispositions of grooves 12 and 34. Thus, protrusion 28 on clamping piece 22 can be fitted in any of the grooves and the point end of threaded knob 24 of clamping unit 20 can extend into any of the grooves. As a result, the position of clamping unit 20 can be reversed from the position illustrated in the drawings and the clamping unit can be arranged on support member 10 to be received by grooves 40 and 42.

Figure 5:
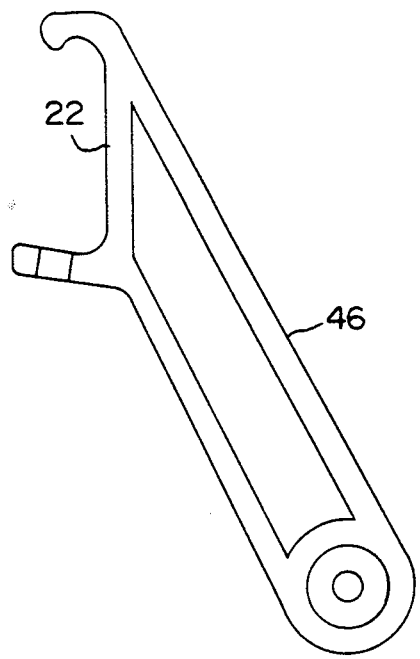
FIG. 5 is a plan view of a first typical component, incorporating the clamping piece of a mounting system constructed in accordance with the present invention, which can be mounted on a support member constructed in accordance with the present invention.
Figure 6:
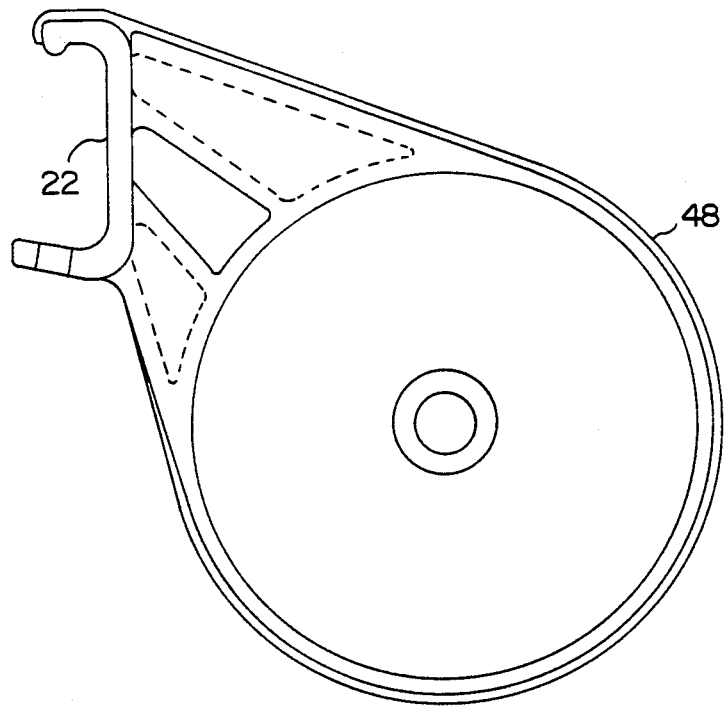
FIG. 6 is a plan view of a second typical component, incorporating the clamping piece of a mounting system constructed in accordance with the present invention, which can be mounted on a support member constructed in accordance with the present invention.

FIGS. 5 and 6 illustrate two typical components which can be mounted on support member 10. FIG. 5 illustrates a bracket 46 on which a utility pole can be mounted for supporting, for example, an infusion pump and FIG. 6 illustrates a bracket 48 to which a shelf can be mounted for supporting, for example, a patient monitor. Bracket 46 and bracket 48 can be cast integral with clamping piece 22.

Although the embodiment of the invention illustrated in the drawings, with the protrusion on the clamping piece and the groove in the support member, is preferred, the protrusion can be arranged on the support member with the groove disposed in the clamping piece. The locking means would be modified accordingly to accommodate a protrusion on the support member.

As shown in FIGS. 1 through 3 and FIGS. 7 and 8, support member 10 is in the form of a channel having an opening extending along the length of the support channel. This permits passing one or more cables 49 and 50 into support channel 10, so that the cables extend within the support channel along the length of the support channel.

After cables 49 and 50 have been introduced into support channel 10, the opening extending along the length of the support channel is closed off by one or more clips 52, 54, 56 and 58 which are snap-fitted into the opening at selected locations along the length of the support channel. These snap-fit clips define edges of smaller openings spaced along the length of support channel 10 through which cables 49 and 50, extending within the support channel, pass. Besides providing containment of and support for the cables, the clips serve to prevent unwanted matter from collecting in support channel 10 and add to the appearance of the support channel by closing off the opening extending along the length of the support channel except for the smaller openings through which cables 49 and 50 pass.

Figure 7:
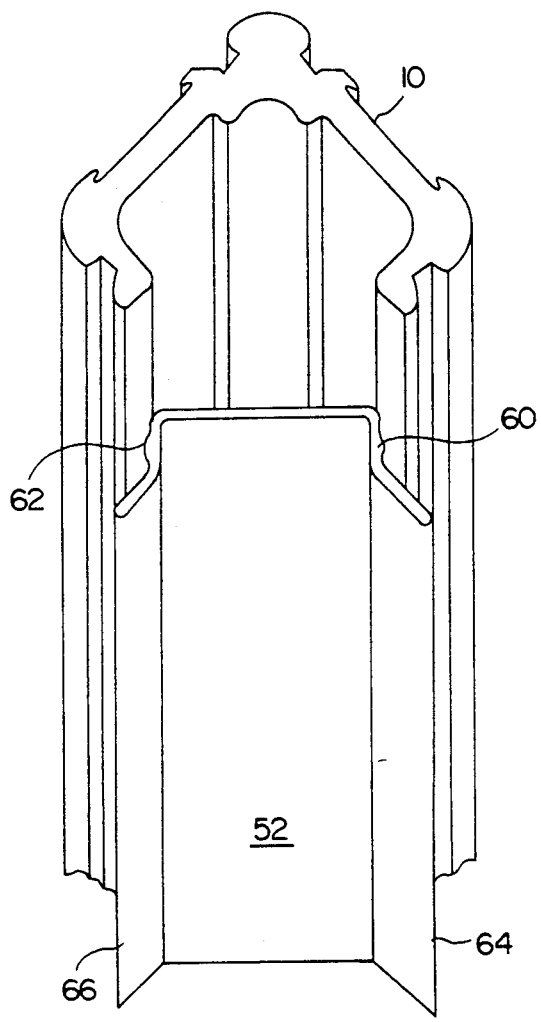
FIG. 7 is a perspective view of a second preferred embodiment of a mounting system, constructed in accordance with the present invention, prior to assembly.
Figure 8:
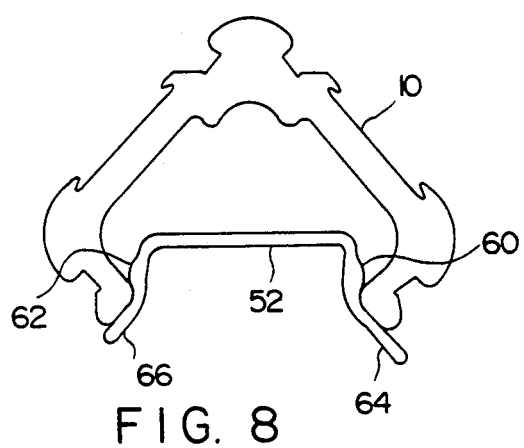
FIG. 8 is a top view of the FIG. 5 mounting system after assembly.
Figure 9:
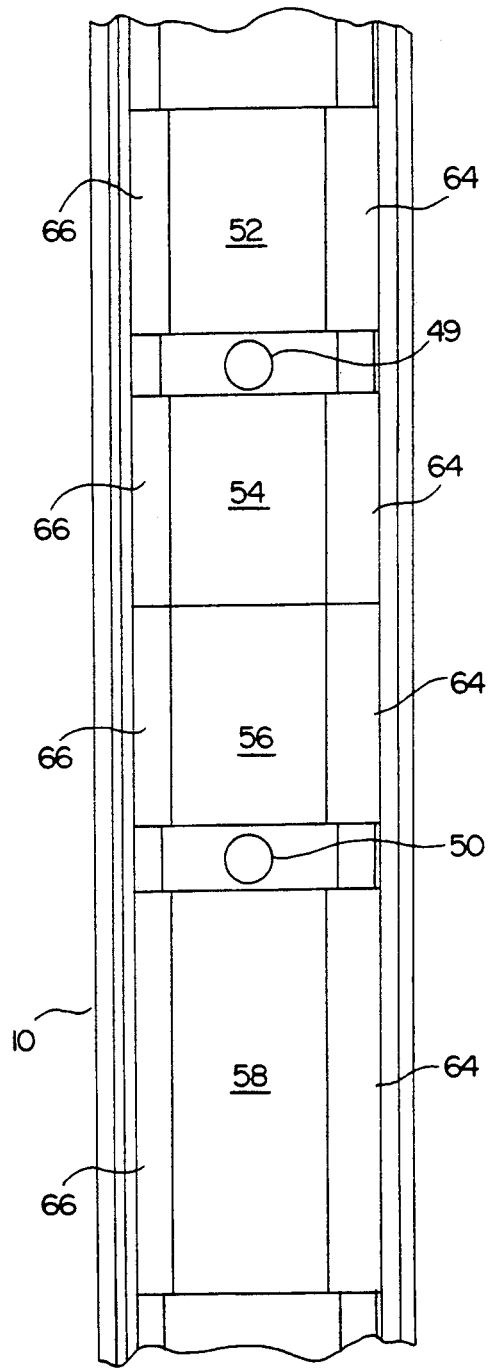
FIG. 9 is a front view of the FIG. 5 mounting system after assembly.

The snap-fit clips are sufficiently flexible, so that they can be installed by simply pushing them against and into support channel 10 from the position shown in FIG. 7 to the position shown in FIG. 8. Each of the clips has a pair of bulges 60 and 62 which, upon engagement with the edges of the opening extending along the length of support channel 10 as the clip is pushed into the support channel, cause the clip to deflect permitting the clip to be inserted into the opening. After bulges 60 and 62 clear the edges of the opening in support channel 10, the clip returns to its original shape as illustrated in FIG. 8. One leg 64 of the clip is longer than the other leg 66, so that the clip can be gripped and flexed for removal from support channel 10.

A mounting system, constructed in accordance with the present invention, can be arranged as a stand-alone assembly or can be mounted on a wall or on a piece of equipment, such as an incubator. Also, the support member, while shown disposed vertically, can be disposed horizontally.

The foregoing has set forth exemplary and preferred embodiments of the present invention. It will be understood, however, that various alternatives will occur to those of ordinary skill in the art without departure from the spirit and scope of the present invention.

What is claimed:

1. A mounting system comprising:
   a support member having a groove extending along the length of said support member in a first surface of said support member and having a pair of opposed contact surfaces forming an acute angle transverse to the length of said support member;
   and a clamping unit releasably mounted on said support member for adjustable positioning of said clamping unit at a selected location along the length of said support member and having:
   (a) a clamping piece having a protrusion at a first end of said clamping piece fitted within said groove in said support member and bearing against said opposed contact surfaces of said groove, and
   (b) a locking member at a second end of said clamping piece separate from said clamping piece and engaging said clamping piece and a second surface of said support member opposite from said first surface of said support member for drawing said protrusion into intimate contact with said opposed contact surfaces of said groove in said support member.

2. A mounting system according to claim 1 wherein said first surface of said support member extends along a first leg of said support member and said second surface of said support member extends along a second leg of said support member parallel to said first leg.

3. A mounting system according to claim 2 wherein said support member has a second groove extending along said support member and said locking member extends into said second groove.

4. A mounting system according to claim 3 wherein said second groove in said support member is identical to said first groove in said support member, whereby the disposition of said clamping unit can be reversed, so that said protrusion on said clamping piece is within said second groove and said locking member extends into said first groove.

5. A mounting system according to claim 1 wherein said support member is a channel having an opening extending along the length of said support member through which a cable can be passed to extend within said support member along the length of said support member and said mounting system further includes a clip snap-fitted into said opening in said channel closing off said opening in said channel and defining an edge of a smaller opening through which a cable extending within said channel passes.

6. A mounting system according to claim 5 further including additional clips spaced along the length of said channel and defining edges of smaller openings spaced along the length of said channel through which cables extending within said channel pass.

7. A mounting system comprising:
a support member having:
 (a) a groove extending along the length of said support member in a first surface extending along a first leg of said support member and having a pair of opposed contact surfaces forming an acute angle transverse to the length of said support member, and
 (b) a second surface extending along a second leg of said support member parallel to said first leg;
and a clamping unit releasably mounted on said support member for adjustable positioning of said clamping unit at a selected location along the length of said support member and having:
 (a) a clamping piece having a protrusion at a first end of said clamping piece fitted within said groove in said support member and bearing against said opposed contact surfaces of said groove, and
 (b) locking means at a second end of said clamping piece engaging said second surface of said support member for applying a force to said second leg of said support member at an angle of less than ninety degrees to said second leg to draw said protrusion into intimate contact with said opposed contact surfaces of said groove in said support member.

8. A mounting system according to claim 7 wherein said locking means include a threaded bore extending through said clamping piece and a threaded knob extending through said threaded bore and having a point end extending into said second groove in said support member.

9. A mounting system according to claim 8 wherein said second groove in said support member is identical to said first groove of said support member, whereby the disposition of said clamping unit can be reversed, so that said protrusion on said clamping piece is within said second groove and said point end of said locking means extend into said first groove.

10. A mounting system comprising:
a support member;
and a clamping unit releasably mounted on said support member for adjustable positioning of said clamping unit at a selected location along the length of said support member and having:
 (a) a clamping piece having a first end bearing against a first surface of said support member, and
 (b) a locking member at a second end of said clamping piece separate from said clamping piece and engaging said clamping piece and a second surface of said support member opposite from said first surface of said support member for drawing said protrusion into intimate contact with said opposed contact surfaces of said groove in said support member;
one of said first surface of said support member and said first end of said clamping piece having a groove having a pair of opposed contact surfaces forming an acute angle transverse to the length of said support member and the other having a protrusion fitted within said groove and bearing against said opposed contact surfaces of said groove.

11. A cable-containing mounting system comprising:
a support channel having an opening extending along the length of said support channel through which a cable can be passed to extend within said support channel along the length of said support channel;
and at least two clips snap-fitted into said opening in said support channel closing off said opening in said support channel and defining edges of at least one smaller opening through which a cable extending within said support channel passes.

12. A mounting system comprising:
a support member having:
 (a) a groove extending along the length of said support member in a first surface extending along a first leg of said support member and having a pair of opposed contact surfaces forming an acute angle transverse to the length of said support member, and
 (b) a second surface extending along a second leg of said support member parallel to said first leg;
and a clamping unit releasably mounted on said support member for adjustable positioning of said clamping unit at a selected location along the length of said support member and having:
 (a) a clamping piece having:
  (i) a protrusion at a first end of said clamping piece fitted within said groove in said support member and bearing against said opposed contact surfaces of said groove, and
  (ii) a threaded bore extending through said clamping piece at a second end of said clamping piece, and
 (b) a threaded knob extending through said threaded bore and having a point end bearing against said second surface of said support member for drawing said protrusion into intimate contact with said contact surfaces of said groove in said support member.

13. A mounting system according to claim 12 wherein said support member has a second groove extending along said support member in said second surface of said support member and said point end of said threaded knob extends into said second groove.

14. A mounting system comprising:
a support member having:
(a) a first groove extending along the length of said support member in a first surface extending along a first leg of said support member and having a pair of opposed contact surfaces forming an acute angle transverse to the length of said support member,
(b) a second groove identical to said first groove extending along the length of said support member in a second surface extending along a second leg of said support member parallel to said first leg,
(c) third and fourth grooves extending along the length of said support member in third and fourth surfaces, respectively, extending along third and fourth legs, respectively, of said support member and disposed relative to each other identical to the relative dispositions of said first and said second grooves;
and a clamping unit releasably mounted on said support member for adjustable positioning of said clamping unit at a selected location along the length of said support member and having:
(a) a clamping piece having a protrusion at a first end of said clamping piece fitted within one of said grooves in said support member and bearing against said opposed contact surfaces of said one groove within which said protrusion is fitted, and
(b) locking means at a second end of said clamping piece engaging a surface of said support member opposite from said one groove within which said protrusion is fitted for drawing said protrusion into intimate contact with said opposed contact surfaces of said one groove in which said protrusion is fitted, whereby said protrusion on said clamping piece can fit within any of said grooves and said locking means can extend into any of said grooves opposite from said groove within which said protrusion is fitted.

* * * * *

UNITED STATES PATENT AND TRADEMARK OFFICE
CERTIFICATE OF CORRECTION

PATENT NO. : 5,106,050

DATED : April 21, 1992

INVENTOR(S) : Robert K. Vaccaro, Arie Cohen, Kevin J. Grant

It is certified that error appears in the above—identified patent and that said Letters Patent is hereby corrected as shown below:

Col. 1, line 42 - Insert "length" between "the" and "of".

Col. 2, line 27 - Change "Fig. 5" to --Fig. 7--.

Col. 2, line 29 - Change "Fig. 5" to --Fig. 7--.

Signed and Sealed this

Twenty-eighth Day of September, 1993

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,106,050
DATED : April 21, 1992
INVENTOR(S) : Robert K. Vaccaro, et al.

It is certified that error appears in the above-indentified patent and that said Letters Patent is hereby corrected as shown below:

Col. 1, line 42, insert "length" between "the" and "of".
Col 2, line 27 - "Fig. 5" should be --Fig. 7--
Col 2, line 29 - "Fig. 5" should be --Fig. 7--
This certificate supercedes Certificate of Correction issued September 28, 1993.

Signed and Sealed this

Ninth Day of November, 1993

Attest:

BRUCE LEHMAN

Attesting Officer           Commissioner of Patents and Trademarks